(12) United States Patent
Shimada (10) Patent No.: US 9,373,930 B2
(45) Date of Patent: Jun. 21, 2016

(54) METHOD OF DETERMINING DECREASE OF OPTICAL OUTPUT POWER IN OPTICAL AMPLIFIER APPARATUS AND OPTICAL AMPLIFIER SYSTEM

(71) Applicant: FUJIKURA LTD., Tokyo (JP)

(72) Inventor: Noriaki Shimada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/860,768

(22) Filed: Sep. 22, 2015

(65) Prior Publication Data

US 2016/0013612 A1    Jan. 14, 2016

Related U.S. Application Data

(63) Continuation of application No. PCT/JP2014/050631, filed on Jan. 16, 2014.

(30) Foreign Application Priority Data

Mar. 25, 2013   (JP) .................................. 2013-062111

(51) Int. Cl.
*H01S 3/00*         (2006.01)
*H01S 3/13*         (2006.01)
(Continued)

(52) U.S. Cl.
CPC ............. *H01S 3/1301* (2013.01); *H01S 3/0675* (2013.01); *H01S 3/1305* (2013.01); *H01S 3/1312* (2013.01); *H01S 3/094076* (2013.01)

(58) Field of Classification Search
CPC ... H01S 3/1305; H01S 3/1312; H01S 3/1301; H01S 3/094076

USPC ............................................. 359/337, 341.42
See application file for complete search history.

(56) References Cited

U.S. PATENT DOCUMENTS 6,355,905 B1      3/2002   Sasaki et al.
2003/0234240 A1  12/2003   Yamazaki et al.
(Continued)

FOREIGN PATENT DOCUMENTS

JP      2000-135579 A    5/2000
JP       2004-25204 A    1/2004
(Continued)

OTHER PUBLICATIONS

International Search Report dated Apr. 22, 2014, issued in counterpart International Application No. PCT/JP2014/050631 (2 pages).

*Primary Examiner* — Mark Hellner
(74) *Attorney, Agent, or Firm* — Westerman, Hattori, Daniels & Adrian, LLP (57) ABSTRACT

A current $I_i$ supplied to a pumping light source 20 is detected and time-averaged with a predetermined time constant to calculate a time-averaged current $I_{av}$. An optical output power $P_i$ outputted from an amplifying optical fiber 12 is detected and time-averaged with the predetermined time constant to calculate a time-averaged optical output power $P_{av}$. A reference optical output power $P_r$ and a reference current $I_r$ supplied to the pumping light source 20 when the reference optical output power $P_r$ is outputted from an optical fiber laser apparatus 1 are used to calculate an optical output power expectation value $P_{ex} = I_{av} \times P_r / I_r$. The time-averaged optical output power $P_{av}$ and the optical output power expectation value $P_{ex}$ are compared with each other to determine a decrease of an optical output power of the optical amplifier apparatus 1 based on the comparison result.

18 Claims, 7 Drawing Sheets

(51) Int. Cl.
*H01S 3/067* (2006.01)
*H01S 3/131* (2006.01)
*H01S 3/094* (2006.01)

(56) References Cited

U.S. PATENT DOCUMENTS

| | | |
|---|---|---|
| 2004/0258108 A1 | 12/2004 | Iehisa |
| 2009/0207871 A1 | 8/2009 | Koshimae et al. |
| 2011/0194573 A1* | 8/2011 | Yamazaki ............... H01S 3/067 372/6 |
| 2014/0226688 A1* | 8/2014 | Ortiz ..................... H01S 5/0427 372/38.02 |

FOREIGN PATENT DOCUMENTS

| | | |
|---|---|---|
| JP | 2006-165298 A | 6/2006 |
| JP | 2010-238709 A | 10/2010 |
| JP | 2012-186333 A | 9/2012 |
| WO | 03/034555 A1 | 4/2003 |
| WO | 2007/129363 A1 | 11/2007 |

\* cited by examiner

METHOD OF DETERMINING DECREASE OF OPTICAL OUTPUT POWER IN OPTICAL AMPLIFIER APPARATUS AND OPTICAL AMPLIFIER SYSTEM

TECHNICAL FIELD

The present invention relates to a method of determining a decrease of an optical output power in an optical amplifier apparatus, and more particularly to a method of determining that an optical output power from an optical amplifier apparatus such as an optical amplifier or an optical fiber laser is lowered.

BACKGROUND ART

In an optical amplifier or an optical fiber laser, an optical output power therefrom may be lowered because of failure or deterioration of pumping light sources provided within such a device or for some other reasons. Several methods have heretofore been proposed to detect such a decrease of an optical output power (see, e.g., Patent Literatures 1-3).

Patent Literature 1 discloses a method of determining deterioration of a pumping light source from a difference between an optical output from the pumping light source and a reference optical pumping output that has been stored in advance. This method includes calculating an output difference between an optical signal output calculated from an optical output of an optical amplifier and a predetermined set point of the optical output. A driving current of the pumping light source is increased according to the output difference such that the optical output of the optical amplifier is equal to the set point of the optical output. With the method disclosed in Patent Literature 1, however, the set point of the optical output is fixed. Therefore, this method cannot be applied to operations (such as an optical fiber laser) in which an optical output is not fixed (in a case where the intensity of the optical output is modulated).

Furthermore, Patent Literature 2 discloses a method of determining that an optical amplifier is deteriorated when a change of the power of output light from the optical amplifier relative to a change of the power of pumping light is equal to or less than a predetermined lifetime reference value. However, this method determines deterioration of the optical amplifier based on a change of the power of the pumping light and a change of the power of the output light. Therefore, deterioration of the optical amplifier cannot be determined during a continuous-wave oscillation (CW) operation, during which the power of the output light is controlled to be constant.

Moreover, Patent Literature 3 discloses a method of detecting a laser beam leaking out of a fused portion, where failure is likely to occur, with imaging means upon occurrence of a failure. According to this method, however, portions where failure or deterioration is likely to occur should be predetermined as targets to be monitored when the imaging means are located. If a large number of such portions exist, a plurality of imaging means are required. Furthermore, this method can only detect failure or deterioration at specific portions corresponding to the imaging means. Additionally, a space is required to dispose the imaging means around the optical fiber laser body. Therefore, this method is disadvantageous to high-density packaging.

PRIOR ART LITERATURE

Patent Literature

Patent Literature 1: JP 2006-165298 A
Patent Literature 2: JP 2012-186333 A
Patent Literature 3: JP 2010-238709 A

SUMMARY OF INVENTION

Problem(s) to be Solved by the Invention

The present invention has been made in view of the aforementioned problems in the prior art. It is, therefore, an object of the present invention to provide a method that can readily determine a decrease of an optical output power of an optical amplifier apparatus either during a continuous-wave oscillation operation or during a modulation operation.

Furthermore, another object of the present invention is to provide an optical amplifier system that can readily determine a decrease of an optical output power of an optical amplifier apparatus either during a continuous-wave oscillation operation or during a modulation operation.

Means for Solving Problem(s)

According to a first aspect of the present invention, there is provided a method of determining a decrease of an optical output power in an optical amplifier apparatus operable to output high-power light with use of pumping light from a pumping light source. In this method, a reference current $I_r$ supplied to the pumping light source is acquired when a predetermined reference optical output power $P_r$ that is equal to or greater than a maximum optical output power being used is outputted from the optical amplifier apparatus. A current $I_i$ supplied to the pumping light source is detected during an operation of the optical amplifier apparatus. The detected current $I_i$ is time-averaged with a predetermined time constant to calculate a time-averaged current $I_{av}$. An optical output power $P_i$ outputted from the optical amplifier apparatus is detected during the operation of the optical amplifier apparatus. The detected optical output power $P_i$ is time-averaged with a predetermined time constant to calculate a time-averaged optical output power $P_{av}$. An optical output power expectation value $P_{ex}$ represented by $P_{ex}=I_{av} \times P_r/I_r$ is calculated from the time-averaged current $I_{av}$, the reference optical output power $P_r$, and the reference current $I_r$. The time-averaged optical output power $P_{av}$ is compared with the optical output power expectation value $P_{ex}$ to determine a decrease of an optical output power of the optical amplifier apparatus based on the comparison result.

When the time-averaged optical output power $P_{av}$ is compared with the optical output power expectation value $P_{ex}$ to determine a decrease of the optical output power of the optical amplifier apparatus based on the comparison result, a difference ($P_{ex}-P_{av}$) between the optical output power expectation value $P_{ex}$ and the time-averaged optical output power $P_{av}$ may be calculated. The optical output power of the optical amplifier apparatus may be determined to be lowered when the difference is greater than a predetermined threshold. In this case, the predetermined threshold may be represented by $I_1 \times P_r/I_r$ where $I_1$ is a threshold current of the optical amplifier apparatus for a continuous-wave oscillation operation.

Alternatively, when the time-averaged optical output power $P_{av}$ is compared with the optical output power expectation value $P_{ex}$ to determine a decrease of the optical output power of the optical amplifier apparatus based on the comparison result, a ratio ($P_{av}/P_{ex}$) of the time-averaged optical output power $P_{av}$ to the optical output power expectation value $P_{ex}$ may be calculated. The optical output power of the optical amplifier apparatus may be determined to be lowered when the ratio is smaller than a predetermined threshold.

Furthermore, a modified optical output power expectation value $P_{ex}'$ may be calculated, which is represented by $P_{ex}'=(I_{av}-I_2) \times P_r/(I_r-I_2)$ where $I_2$ is a threshold current of the optical amplifier apparatus for a modulation operation. The modified optical output power expectation value $P_{ex}'$ may be used instead of the optical output power expectation value $P_{ex}$ to determine a decrease of the optical output power of the optical amplifier apparatus.

Moreover, the predetermined threshold may be varied depending upon the detected current $I_i$.

According to a second aspect of the present invention, there is provided an optical amplifier system having an optical amplifier apparatus operable to output high-power light with use of pumping light from a pumping light source. This optical amplifier system has a storage device operable to store a predetermined reference optical output power $P_r$ that is equal to or greater than a maximum optical output power being used in the optical amplifier apparatus and a reference current $I_r$ supplied to the pumping light source when the reference optical output power $P_r$ is outputted, a current detector operable to detect a current $I_i$ supplied to the pumping light source, a time-averaged current calculator part operable to time-average the current $I_i$ detected by the current detector with a predetermined time constant to calculate a time-averaged current $I_{av}$, an optical output power detector operable to detect an optical output power $P_i$ outputted from the optical amplifier apparatus, and a time-averaged optical output power calculator operable to time-average the optical output power $P_i$ detected by the optical output power detector with the predetermined time constant to calculate a time-averaged optical output power $P_{av}$. The optical amplifier system also has a determination part operable to determine a decrease of an optical output power of the optical amplifier apparatus. The determination part is operable to calculate an optical output power expectation value $P_{ex}$ represented by $P_{ex}=I_{av} \times P_r/I_r$ from the time-averaged current $I_{av}$ calculated by the time-averaged current calculator part and the reference optical output power $P_r$ and the reference current $I_r$ stored in the storage device and to compare the time-averaged optical output power $P_{av}$ calculated by the time-averaged optical output power calculator with the optical output power expectation value $P_{ex}$ to determine a decrease of an optical output power of the optical amplifier apparatus based on the comparison result.

The determination part may be operable to calculate a difference $(P_{ex}-P_{av})$ between the optical output power expectation value $P_{ex}$ and the time-averaged optical output power $P_{av}$ and to determine that the optical output power of the optical amplifier apparatus is lowered when the difference is greater than a predetermined threshold. In this case, the predetermined threshold may be represented by $I_1 \times P_r/I_r$ where $I_1$ is a threshold current of the optical amplifier apparatus for a continuous-wave oscillation operation.

Alternatively, the determination part may be operable to calculate a ratio $(P_{av}/P_{ex})$ of the time-averaged optical output power $P_{av}$ to the optical output power expectation value $P_{ex}$ and to determine that the optical output power of the optical amplifier apparatus is lowered when the ratio is smaller than a predetermined threshold.

The determination part may be operable to calculate a modified optical output power expectation value $P_{ex}'$ represented by $P_{ex}'=(I_{av}-I_2) \times P_r/(I_r-I_2)$ where $I_2$ is a threshold current of the optical amplifier apparatus for a modulation operation and to use the modified optical output power expectation value $P_{ex}'$ instead of the optical output power expectation value $P_{ex}$ to determine a decrease of the optical output power of the optical amplifier apparatus.

Furthermore, the determination part may be operable to vary the predetermined threshold depending upon the detected current $I_i$ by the current detector.

Advantageous Effects of the Invention

According to the present invention, a decrease of an optical output power is determined based on a value obtained by time-averaging a current supplied to a pumping light source and a value obtained by time-averaging an optical output power outputted from an optical amplifier apparatus. Therefore, a decrease of an optical output power can readily be determined either during a continuous-wave oscillation operation or during a modulation operation.

MODE(S) FOR CARRYING OUT THE INVENTION

An embodiment of the present invention will be described in detail below with reference to FIGS. 1 to 10. The same or corresponding components are denoted by the same reference numerals in FIGS. 1 to 10 so as to avoid redundant explanation.

Figure 1:
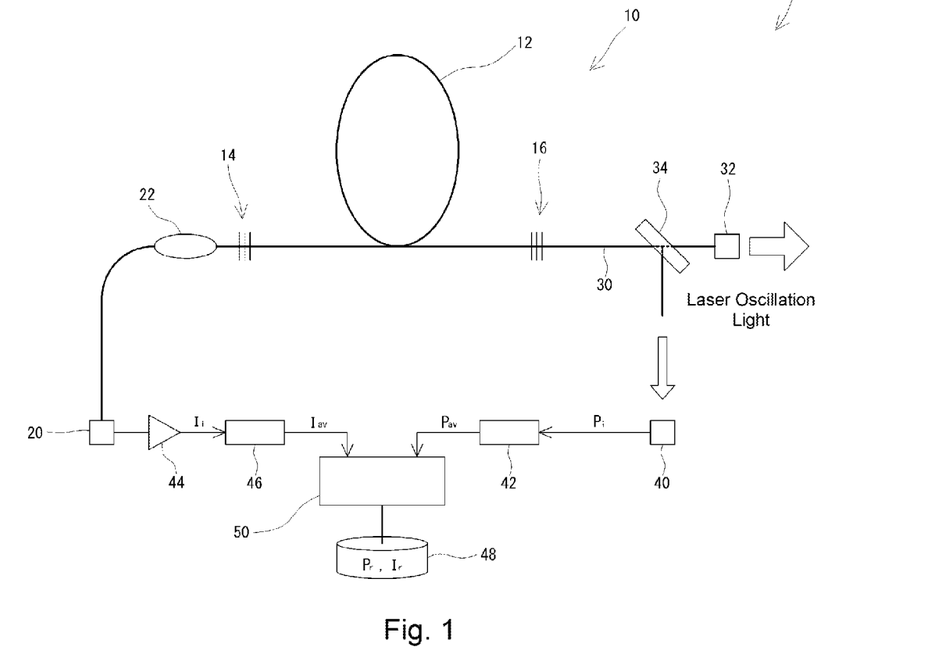
FIG. 1 is a schematic view showing a configuration of an optical amplifier system according to an embodiment of the present invention.

FIG. 1 is a schematic view showing a configuration of an optical amplifier system according to an embodiment of the present invention. The present embodiment describes an example in which an optical fiber laser apparatus is used as an optical amplifier system. However, the present invention is not limited to this example.

As shown in FIG. 1, an optical fiber laser apparatus 1 of the present embodiment has an optical cavity 10, at least one pumping light source 20 operable to introduce pumping light from an end of the optical cavity 10 into the optical cavity 10, and a combiner 22 operable to introduce the pumping light from the pumping light source 20 into the optical cavity 10.

The optical cavity 10 includes an amplifying optical fiber 12, a high-reflectivity fiber Bragg grating (FBG) 14 connected to an end of the amplifying optical fiber 12, and a low-reflectivity FBG 16 connected to another end of the amplifying optical fiber 12. The high-reflectivity FBG 14 and the low-reflectivity FBG 16 are arranged so as to meet certain resonance conditions. A light emission part 32 operable to emit laser oscillation light is provided on an end of an optical path 30 extending from the low-reflectivity FBG 16 to an exterior of the optical cavity 10.

In the present embodiment, the pumping light source 20 and the combiner 22 are provided only near the high-reflectivity FBG 14 so as to form a forward pumping type optical fiber laser apparatus. Nevertheless, a pumping light source and a combiner may be provided only near the low-reflectivity FBG 16 so as to form a backward pumping type optical fiber laser apparatus. Alternatively, a pumping light source and a combiner may be provided near each of the high-reflectivity FBG 14 and the low-reflectivity FBG 16 so as to form a bidirectional pumping type optical fiber laser apparatus.

With this configuration, when pumping light is introduced from the pumping light source 20 into the amplifying optical fiber 12 of the optical cavity 10, then laser oscillation light is generated within the optical cavity 10 by excitation in the amplifying optical fiber 12 and by the high-reflectivity FBG 14 and the low-reflectivity FBG 16 that are arranged so as to meet certain resonance conditions. Part of the laser oscillation light is reflected from the low-reflectivity FBG 16 and returned to the amplifying optical fiber 12. However, most of the laser oscillation light passes through the low-reflectivity FBG 16 and is emitted from the light emission part 32.

A partial reflection mirror 34 for reflecting part of the laser oscillation light emitted from the optical cavity 10 is provided on the optical path 30 extending from the low-reflectivity FBG 16 to the exterior of the optical cavity 10. The optical fiber laser apparatus 1 has an optical output power detector 40 operable to detect an optical output power $P_i$ of the laser oscillation light reflected from the partial reflection mirror 34 and a time-averaged optical output power calculator 42 operable to time-average the optical output power $P_i$ detected by this optical output power detector 40 to calculate a time-averaged optical output power $P_{av}$. In the present embodiment, the partial reflection mirror 34 is used to introduce the laser oscillation light to the optical output power detector 40. Nevertheless, the present invention is not limited to this example. For example, the laser oscillation light may be introduced into the optical output power detector 40 with an optical coupler, a splitter, or a fused portion for emitting leakage light.

The optical fiber laser apparatus 1 has a current detector 44 operable to detect an electric current $I_i$ supplied to the pumping light source 20 (hereinafter referred to as a pumping light source current) and a time-averaged current calculator part 46 operable to time-average the pumping light source current $I_i$ detected by the current detector 44 to calculate a time-averaged current $I_{av}$. The optical fiber laser apparatus 1 also has a storage device 48 operable to store data as described later and a determination part 50 connected to the time-averaged optical output power calculator 42 and the time-averaged current calculator part 46. This determination part 50 is supplied with the time-averaged current $I_{av}$ calculated by the time-averaged current calculator part 46 and the time-averaged optical output power $P_{av}$ calculated by the time-averaged optical output power calculator 42.

Figure 2:
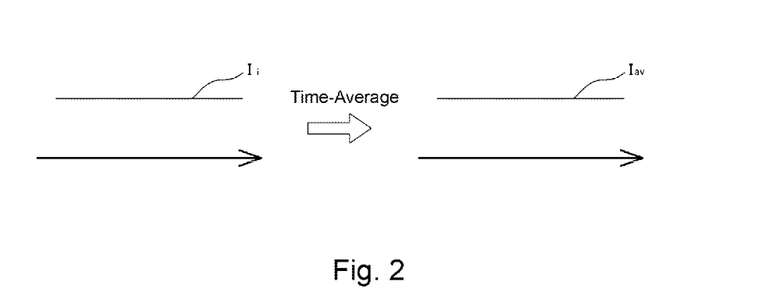
FIG. 2 is a diagram schematically showing a pumping light source current $I_i$ inputted into a time-averaged current calculator part and a time-averaged current $I_{av}$ outputted from a time-averaged current calculator part of the optical amplifier system shown in FIG. 1 during a CW operation.

FIG. 2 is a diagram schematically showing a pumping light source current $I_i$ inputted into the time-averaged current calculator part 46 and a time-averaged current $I_{av}$ outputted from the time-averaged current calculator part 46 during a CW operation. The time-averaged current calculator part 46 is operable to time-average the inputted pumping light source current $I_i$ with a predetermined time constant to output the time-averaged current $I_{av}$. Since the pumping light source current $I_i$ is constant during the CW operation, the time-averaged current $I_{av}$ outputted from the time-averaged current calculator part 46 is equal to the pumping light source current $I_i$ and has a fixed value as shown in FIG. 2. Similarly, the time-averaged optical output power calculator 42 is operable to time-average the optical output power $P_i$ detected by the optical output power detector 40 with a predetermined time constant. Since the optical output power $P_i$ is constant during the CW operation, the time-averaged optical output power $P_{av}$ outputted from the time-averaged optical output power calculator 42 is equal to the optical output power $P_i$ and has a fixed value.

Figure 3:
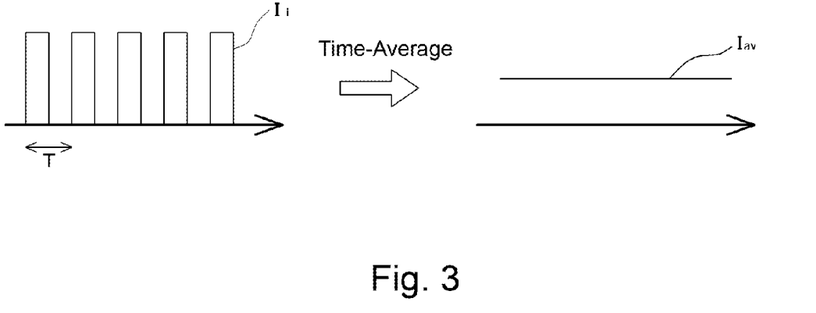
FIG. 3 is a diagram schematically showing a pumping light source current $I_i$ inputted into the time-averaged current calculator part and a time-averaged current $I_{av}$ outputted from the time-averaged current calculator part during a modulation operation.

FIG. 3 is a diagram schematically showing a pumping light source current $I_i$ inputted into the time-averaged current calculator part 46 and a time-averaged current $I_{av}$ outputted from the time-averaged current calculator part 46 during a modulation operation. Even if the pumping light source current $I_i$ varies at various cycles and duties with time in a modulation operation, the time-averaged current calculator part 46 time-averages the inputted pumping light source current $I_i$ with a predetermined time constant. Therefore, the time-averaged current calculator part 46 can output a time-averaged current $I_{av}$ that has absorbed the variations of the pumping light source current $I_i$. For example, as schematically shown in FIG. 3, if the pumping light source current $I_i$ varies at a certain cycle, the time-averaged current $I_{av}$ outputted from the time-averaged current calculator part 46 becomes constant. When a modulation cycle of the pumping light source current $I_i$ is defined as T, it is preferable to use the time constant of 2T to 10T for the time-average of the time-averaged current calculator part 46. Similarly, even if the optical output power $P_i$ varies at various cycles and duties with time in a modulation operation, the time-averaged optical output power calculator 42 time-averages the optical output power $P_i$ detected by the optical output power detector 40 with a predetermined time constant. Therefore, the time-averaged optical output power calculator 42 can output a time-averaged optical output power $P_{av}$ that has absorbed the variations of the optical output power $P_1$. In this case, it is preferable to use the same time constant for the time-average of the pumping light source current $I_i$ and the time-average of the optical output power $P_i$.

By thus using the same time constant for the time-average of the pumping light source current $I_i$ and the time-average of the optical output power $P_i$, the detection precision of the optical output power $P_i$ to the pumping light source current $I_i$ can be improved.

Figure 4:
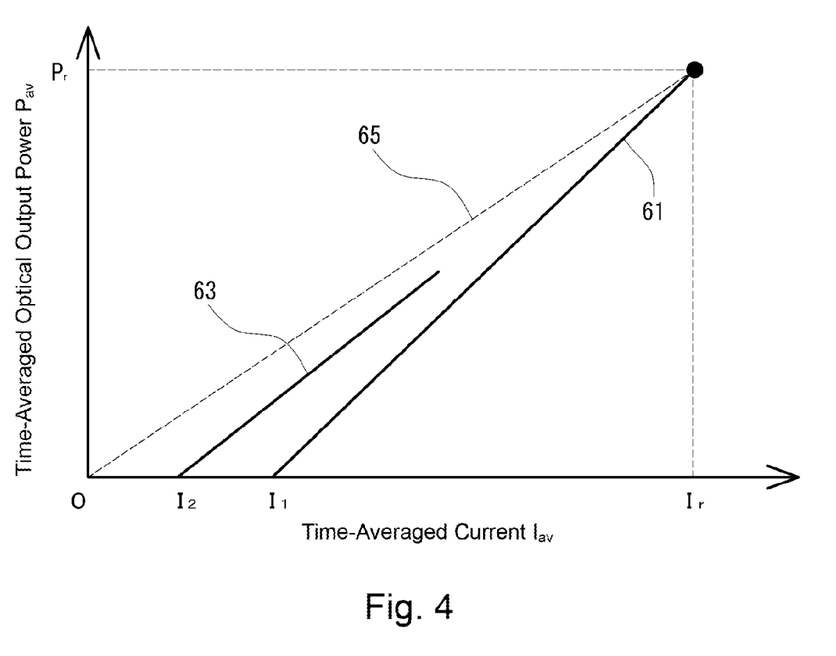
FIG. 4 is a graph showing the relationship between the time-averaged optical output power $P_{av}$ and the time-averaged current $I_{av}$ during the CW operation (61) and during the modulation operation (63) in the optical amplifier system shown in FIG. 1.

FIG. 4 is a graph showing characteristics of the time-averaged current $I_{av}$ and the time-averaged optical output power $P_{av}$. In FIG. 4, a straight line 61 illustrates the relationship between the time-averaged current $I_{av}$ and the time-averaged optical output power $P_{av}$ in an initial state of a CW operation of the optical fiber laser apparatus 1. As illustrated by this straight line 61, if the time-averaged current $I_{av}$ (=the pumping light source current $I_i$) is smaller than a threshold (threshold current) $I_1$ during the CW operation, no laser oscillation light is emitted from the light emission part 32. However, if the time-averaged current $I_{av}$ becomes greater than the threshold current $I_1$, the time-averaged optical output power $P_{av}$ increases at a certain rate.

Furthermore, a straight line 63 illustrates the relationship between the time-averaged current $I_{av}$ and the time-averaged optical output power $P_{av}$ in an initial state of a modulation operation of the optical fiber laser apparatus 1. As illustrated by this straight line 63, if the time-averaged current $I_{av}$ is smaller than a threshold (threshold current) $I_2$ during the modulation operation of the optical fiber laser apparatus 1, no laser oscillation light is emitted from the light emission part 32. However, if the time-averaged current $I_{av}$ becomes greater than the threshold current $I_2$, the time-averaged optical output power $P_{av}$ increases at a certain rate. This threshold current $I_2$ is smaller than the threshold current $I_1$ for the CW operation and varies depending upon conditions of modulation.

Figure 5:
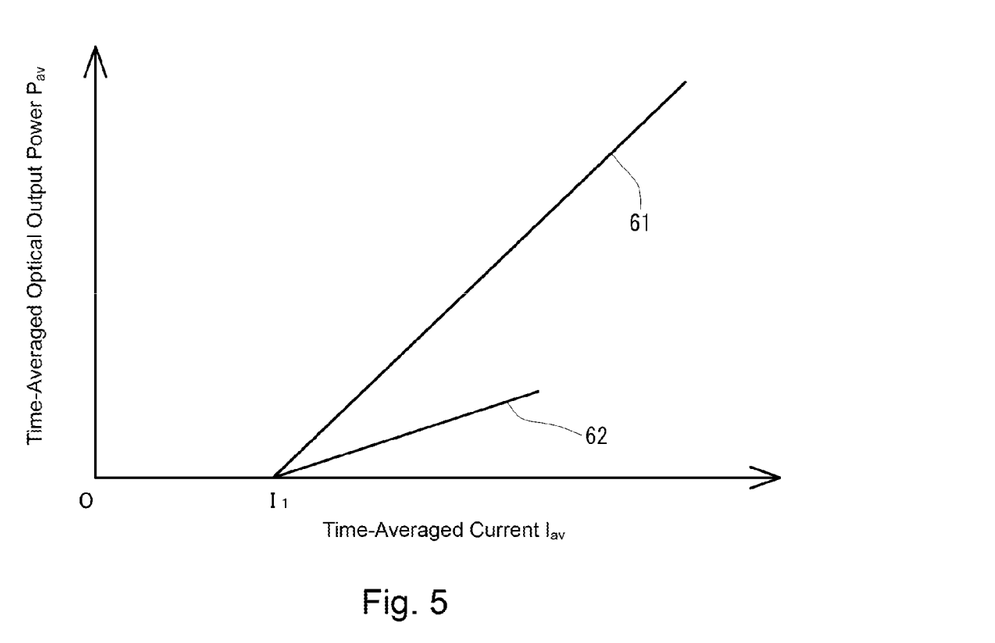
FIG. 5 is a graph showing the relationship between the time-averaged optical output power $P_{av}$ and the time-averaged current $I_{av}$ during the CW operation in the optical amplifier system shown in FIG. 1, which illustrates an initial state (61) and a deteriorated state (62).
Figure 6:
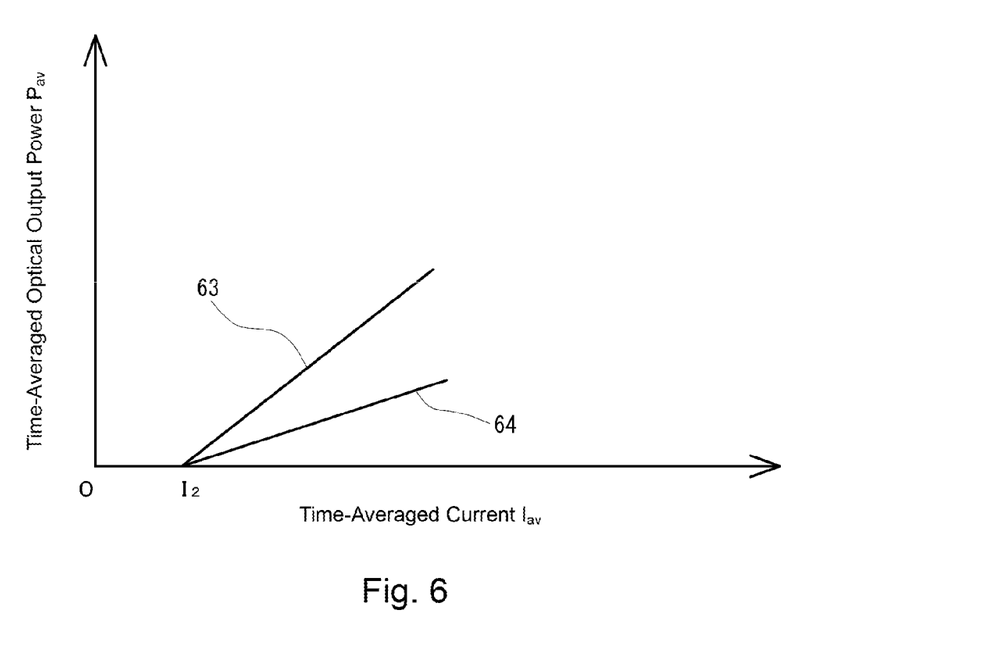
FIG. 6 is a graph showing the relationship between the time-averaged optical output power $P_{av}$ and the time-averaged current $I_{av}$ during the modulation operation in the optical amplifier system shown in FIG. 1, which illustrates an initial state (63) and a deteriorated state (64).

Meanwhile, if failure or deterioration occurs in any component of the optical fiber laser apparatus 1, a ratio of increase of the time-averaged optical output power $P_{av}$ to the time-averaged current $I_{av}$ is lowered. Specifically, as shown in FIG. 5, the time-averaged current $I_{av}$ and the time-averaged optical output power $P_{av}$ have characteristics illustrated by the straight line 61 in the initial state of the CW operation. However, if failure or deterioration occurs in any component of the optical fiber laser apparatus 1, the gradient of the line decreases as indicated by a straight line 62. Similarly, as shown in FIG. 6, the time-averaged current $I_{av}$ and the time-averaged optical output power $P_{av}$ have characteristics illustrated by the straight line 63 in the initial state of the modulation operation. However, if failure or deterioration occurs in any component of the optical fiber laser apparatus 1, the gradient of the line decreases as indicated by a straight line 64.

In the present embodiment, such a change of the characteristics of the time-averaged current $I_{av}$ and the time-averaged optical output power $P_{av}$ is used to determine a decrease of an optical output power. More specifically, a reference optical output power $P_r$ and a corresponding time-averaged current $I_{av}$ (=the pumping light source current $I_i$) in the initial state of the CW operation of the optical fiber laser apparatus 1 are used to determine a decrease of the optical output power. Now a method of determining a decrease of an optical output power according to an embodiment of the present invention will be described.

First, a certain reference optical output power $P_r$, which is equal to or greater than the maximum optical output power being used, is determined. For example, a rated optical output power may be used for this reference optical output power $P_r$. In an initial state of a CW operation of the optical fiber laser apparatus 1, a time-averaged current $I_{av}$ (=the pumping light source current $I_i$) at the time when the reference optical output power $P_r$ (for example, 100 W) is outputted during the CW operation is measured and acquired as a reference current $I_r$ (see FIG. 4). This reference current $I_r$ is stored in the storage device 48 along with the reference optical output power $P_r$. Various kinds of storage devices including hard disk drives, RAMs, and flash memories may be used for the storage device 48.

A straight line 65 illustrated in FIG. 4, which passes through the origin with a gradient of $P_r/I_r$, is defined as an expectation value $P_{ex}$ of the time-averaged optical output power $P_{av}$ with respect to the time-averaged current $I_{av}$. This optical output power expectation value $P_{ex}$ is defined by the following formula (1).

$$P_{ex}=I_{av} \times P_r/I_r \qquad (1)$$

As described above, when the time-averaged current $I_{av}$ becomes greater than the threshold current $I_1$ during the CW operation, the time-averaged optical output power $P_{av}$ increases at a certain rate as indicated by the straight line 61 of FIG. 4. Furthermore, when the time-averaged current $I_{av}$ becomes greater than the threshold current $I_2$ during the modulation operation, the time-averaged optical output power $P_{av}$ increases at a certain rate as indicated by the straight line 63 of FIG. 4. At that time, the threshold current $I_2$ for the modulation operation is smaller than the threshold current $I_1$ for the CW operation. The threshold current $I_2$ is brought close to the origin as the duty of modulation is reduced. The time-averaged optical output power $P_{av}$ at the reference current $I_r$ in the modulation operation coincides with the reference optical output power $P_r$ at the reference current $I_r$ in the CW operation. Therefore, as the threshold current $I_2$ is brought closer to the origin, the straight line 63 gradually approaches the straight line 65. Accordingly, when the straight line 65 represented by the above formula (1) is defined as the optical output power expectation value $P_{ex}$, a decrease of an optical output power of the optical fiber laser apparatus 1 can be determined by comparing the optical output power expectation value $P_{ex}$ with an actual time-averaged optical output power $P_{av}$.

Furthermore, if the threshold current $I_2$ for the modulation operation has been known, use of the straight line 63 rather than the straight line 65 of FIG. 4 as an optical output power expectation value can enhance the precision of the determination of a decrease of an optical output power. Specifically, a modified optical output power expectation value $P_{ex}'$ defined by the following formula (2) may be used to determine a decrease of an optical output power of the optical fiber laser apparatus 1, instead of the optical output power expectation value $P_{ex}$ represented by the above formula (1).

$$P_{ex}'=(I_{av}-I_2) \times P_r/(I_r-I_2) \qquad (2)$$

The determination part 50 shown in FIG. 1 uses the time-averaged current $I_{av}$ inputted from the time-averaged current calculator part 46, the time-averaged optical output power $P_{av}$ inputted from the time-averaged optical output power calculator 42, and the aforementioned optical output power expectation value $P_{ex}$ to determine a decrease of an optical output power. Specifically, the determination part 50 uses the above formula (1) with the time-averaged current $I_{av}$ inputted from the time-averaged current calculator part 46, and the reference optical output power $P_r$ and the reference current $I_r$ stored in the storage device 48 to calculate the optical output power expectation value $P_{ex}$. The determination part 50 compares the calculated optical output power expectation value $P_{ex}$ with the time-averaged optical output power $P_{av}$ inputted from the time-averaged optical output power calculator 42 and determines a decrease of the optical output power based on the comparison result. Methods of comparing the optical output power expectation value $P_{ex}$ with the time-averaged optical output power $P_{av}$ may include using a difference D ($=P_{ex}-P_{av}$) between the optical output power expectation value $P_{ex}$ and the time-averaged optical output power $P_{av}$ or using a ratio R ($=P_{av}/P_{ex}$) of the time-averaged optical output power $P_{av}$ to the optical output power expectation value $P_{ex}$. Those methods will be described separately for the CW operation and for the modulation operation.

1. Case of Using a Difference D in the CW Operation

Figure 7:
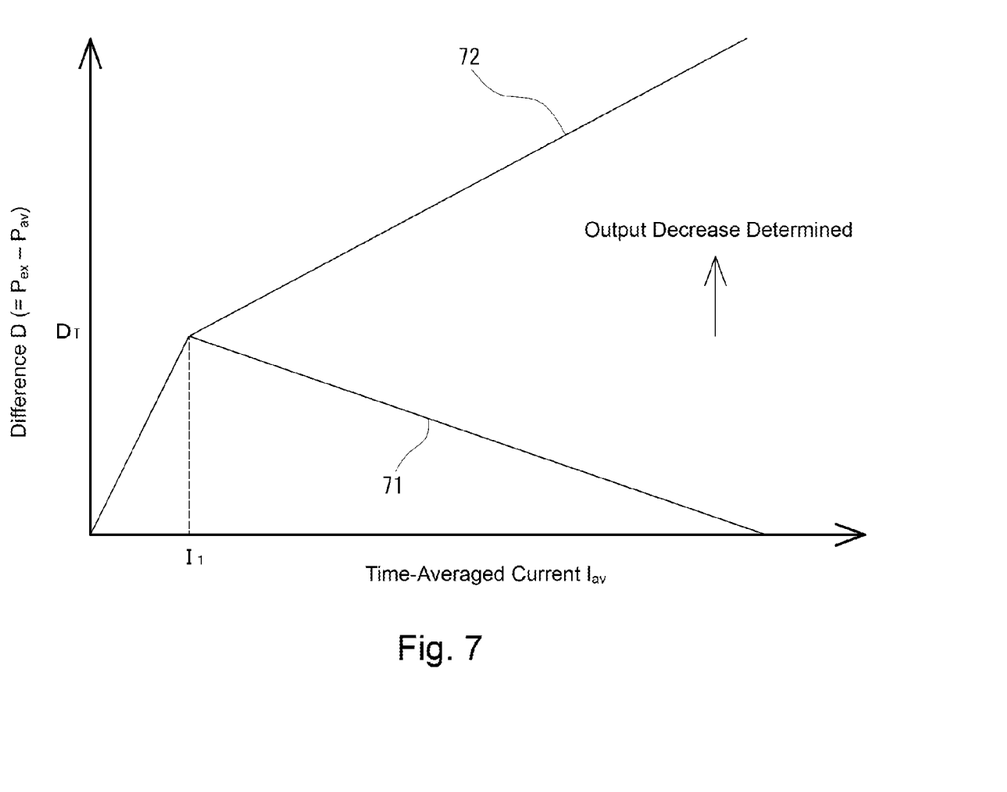
FIG. 7 is a graph explanatory of a method of determining a decrease of an optical output power during the CW operation with a difference $D (=P_{ex}-P_{av})$ between the optical output power expectation value $P_{ex}$ and the time-averaged optical output power $P_{av}$.

FIG. 7 is a graph explanatory of a method of determining a decrease of an optical output power during the CW operation with a difference D ($=P_{ex}-P_{av}$) between the optical output power expectation value $P_{ex}$ and the time-averaged optical output power $P_{av}$. In FIG. 7, the horizontal axis represents the time-averaged current $I_{av}$, and the vertical axis represents the difference D ($=P_{ex}-P_{av}$). In the example of FIG. 7, a threshold $D_T$ is defined as $D_T=I_1 \times P_r/I_r$. Nevertheless, the value of the threshold $D_T$ is not limited to this example. The threshold $D_T$ may have any value as long as it is not less than $I_1 \times P_r/I_r$.

The determination part 50 calculates a difference D ($=P_{ex}-P_{av}$) from the calculated optical output power expectation value $P_{ex}$ and the time-averaged optical output power $P_{av}$ inputted from the time-averaged optical output power calculator 42. When the time-averaged current $I_{av}$ is smaller than the threshold current $I_1$ for the CW operation, the time-averaged optical output power $P_{av}$ is zero (see FIG. 4). Accordingly, as shown in FIG. 7, the difference D increases linearly to $D_T$. When the time-averaged current $I_{av}$ becomes greater than $I_1$, as shown in FIG. 4, the time-averaged optical output power $P_{av}$ increases with respect to the time-averaged current $I_{av}$ at a certain rate. As shown in FIG. 4, a rate of an increase of the time-averaged optical output power $P_{av}$ is higher than a rate of an increase of the optical output power expectation value $P_{ex}$ (the gradient of the straight line 61 of FIG. 4 is higher than the gradient of the straight line 65). Accordingly, if no failure or deterioration occurs in a component, the difference D ($=P_{ex}-P_{av}$) gradually decreases as indicated by a straight line 71 of FIG. 7. On the other hand, if failure or deterioration occurs in any component, the rate of an increase of the time-averaged optical output power $P_{av}$ to the time-averaged current $I_{av}$ is lowered. Therefore, the value of the difference D becomes greater than the straight line 71 of FIG. 7.

In the example of FIG. 7, an undeterminable region in which a decrease of an optical output power cannot be determined is set such that $0 \leq I_{av} \leq I_1$. Thus, the determination part 50 determines that the optical output power is lowered if the calculated difference D becomes greater than the aforementioned threshold $D_T$ in a determinable region where $I_{av} > I_1$. Specifically, in the determinable region of FIG. 7 where $I_{av} > I_1$, the determination part 50 determines that the optical output power is lowered if the difference D is within a region that is higher than the threshold $D_T$. For example, the optical output power is determined to be lowered in the case of the straight line 72.

2. Case of Using a Ratio R in the CW Operation

Figure 8:
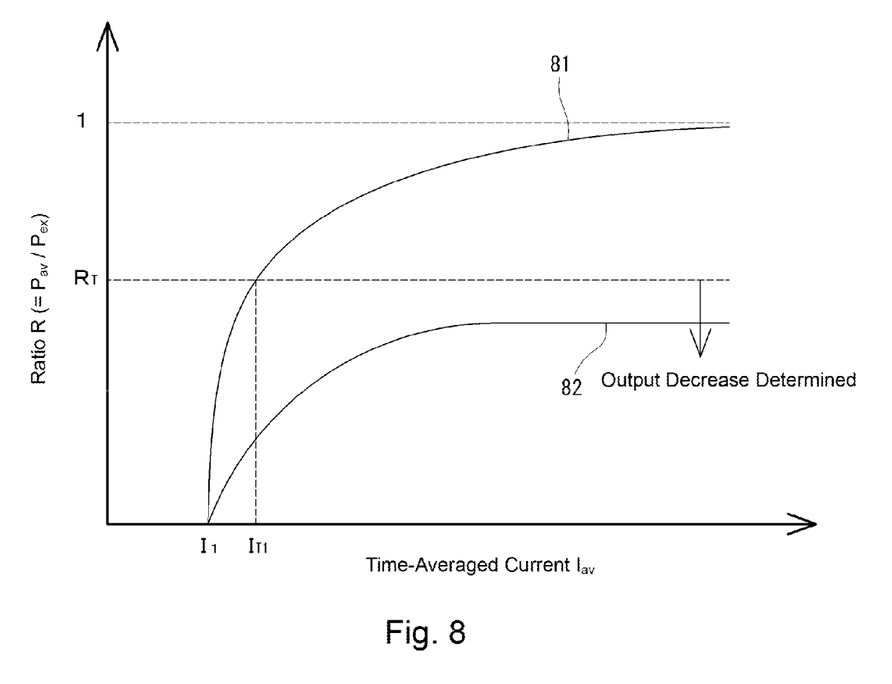
FIG. 8 is a graph explanatory of a method of determining a decrease of an optical output power during the CW operation with a ratio $R (=P_{av}/P_{ex})$ of the optical output power expectation value $P_{ex}$ and the time-averaged optical output power $P_{av}$.

FIG. 8 is a graph explanatory of a method of determining a decrease of an optical output power during the CW operation with a ratio R ($=P_{av}/P_{ex}$) of the optical output power expectation value $P_{ex}$ and the time-averaged optical output power $P_{av}$. In FIG. 8, the horizontal axis represents the time-averaged current $I_{av}$, and the vertical axis represents the ratio R ($=P_{av}/P_{ex}$). A threshold $R_T$ may have any value. For example, the threshold $R_T$ may have a value of 50% or 80%.

The determination part 50 calculates a ratio R ($=P_{av}/P_{ex}$) from the calculated optical output power expectation value $P_{ex}$ and the time-averaged optical output power $P_{av}$ inputted from the time-averaged optical output power calculator 42. In a range where the time-averaged current $I_{av}$ is smaller than the threshold current $I_1$ for the CW operation, the time-averaged optical output power $P_{av}$ is zero (see FIG. 4), the ratio R is zero as shown in FIG. 8. When the time-averaged current $I_{av}$ becomes greater than $I_1$, the time-averaged optical output power $P_{av}$ increases with respect to the time-averaged current $I_{av}$ at a certain rate as shown in FIG. 4. If no failure or deterioration occurs in a component, the ratio R ($=P_{av}/P_{ex}$) rapidly rises from $I_1$ and gradually approaches 1 as indicated by a curved line 81 of FIG. 8. On the other hand, if failure or deterioration occurs in any component, the rate of an increase of the time-averaged optical output power $P_{av}$ to the time-averaged current $I_{av}$ is lowered. Therefore, the ratio R is getting smaller as indicated by a curved line 82 of FIG. 8.

In the example shown in FIG. 8, the time-averaged current $I_{av}$ at the time when the ratio R is equal to the threshold $R_T$ in the characteristics of the initial state (curved line 81) is defined as $I_{T1}$. An undeterminable region in which a decrease of an optical output power cannot be determined is set such that $0 \leq I_{av} \leq I_{T1}$. Thus, the determination part 50 determines that the optical output power is lowered if the calculated ratio R becomes smaller than the aforementioned threshold $R_T$ in a determinable region where $I_{av} > I_{T1}$. Specifically, in the determinable region of FIG. 8 where $I_{av} > I_{T1}$, the determination part 50 determines that the optical output power is lowered if the calculated ratio R is within a region that is lower than the threshold $R_T$. For example, the optical output power is determined to be lowered within a range of $I_{av} > I_{T1}$ in the case of the curved line 82.

3. Case of Using a Difference D in the Modulation Operation

Figure 9:
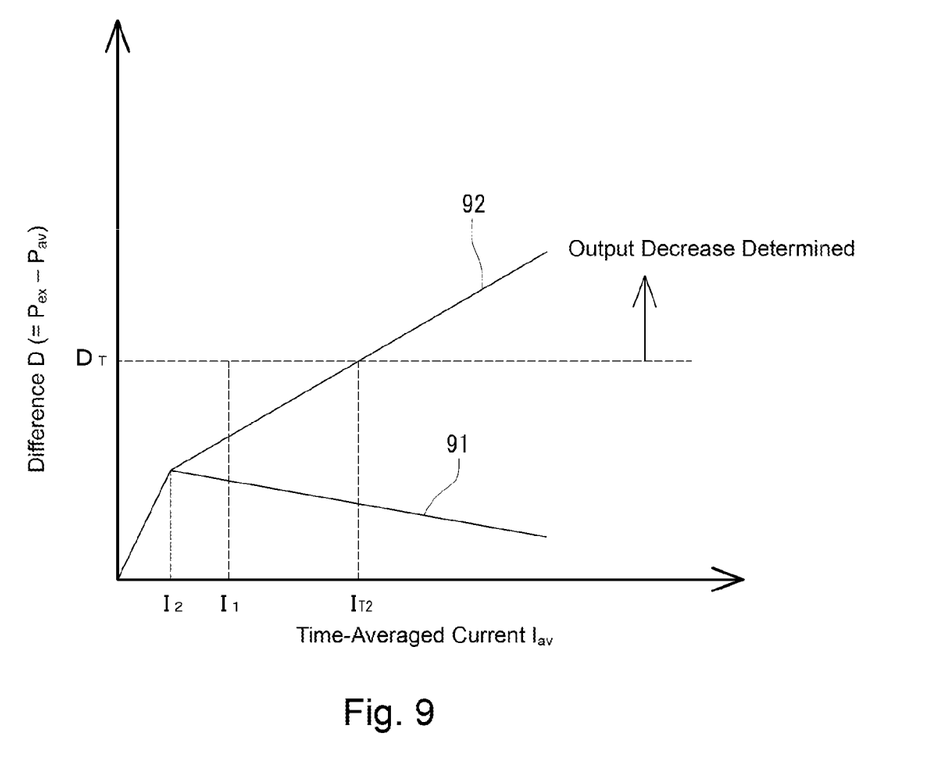
FIG. 9 is a graph explanatory of a method of determining a decrease of an optical output power during the modulation operation with a difference $D (=P_{ex}-P_{av})$ between the optical output power expectation value $P_{ex}$ and the time-averaged optical output power $P_{av}$.

FIG. 9 is a graph explanatory of a method of determining a decrease of an optical output power during the modulation operation with a difference D ($=P_{ex}-P_{av}$) between the optical output power expectation value $P_{ex}$ and the time-averaged optical output power $P_{av}$. In FIG. 9, the horizontal axis represents the time-averaged current $I_{av}$, and the vertical axis represents the difference D ($=P_{ex}-P_{av}$). In the example of FIG. 9, a threshold $D_T$ being used has the same value as the threshold $D_T$ of FIG. 7.

The determination part 50 calculates a difference D ($=P_{ex}-P_{av}$) from the calculated optical output power expectation value $P_{ex}$ and the time-averaged optical output power $P_{av}$ inputted from the time-averaged optical output power calculator 42. When the time-averaged current $I_{av}$ is smaller than the threshold current $I_2$ for the modulation operation, the time-averaged optical output power $P_{av}$ is zero (see FIG. 4). Accordingly, as shown in FIG. 9, the difference D increases linearly. When the time-averaged current $I_{av}$ becomes greater than $I_2$, the time-averaged optical output power $P_{av}$ increases with respect to the time-averaged current $I_{av}$ at a certain rate as shown in FIG. 4. As shown by the straight line 63 of FIG. 4, a rate of an increase of the time-averaged optical output power $P_{av}$ is higher than a rate of an increase of the optical output power expectation value $P_{ex}$ (the gradient of the straight line 63 of FIG. 4 is higher than the gradient of the straight line 65). Accordingly, if no failure or deterioration occurs in a component, the difference D ($=P_{ex}-P_{av}$) gradually decreases as indicated by a straight line 91 of FIG. 9. On the other hand, if failure or deterioration occurs in any component, the rate of an increase of the time-averaged optical output power $P_{av}$ to the time-averaged current $I_{av}$ is lowered. Therefore, the value of the difference D becomes greater than the straight line 91 of FIG. 9.

The determination part 50 determines that the optical output power is lowered if the calculated difference D becomes greater than the aforementioned threshold $D_T$ in the aforementioned determinable region where $I_{av} > I_1$. Specifically, in the determinable region of FIG. 9 where $I_{av} > I_1$, the determination part 50 determines that the optical output power is lowered if the calculated difference D is within a region that is higher than the threshold $D_T$. For example, the optical output power is determined to be lowered within a range of $I_{av} > I_{T2}$ in the case of the straight line 92.

4. Case of Using a Ratio R in the Modulation Operation

Figure 10:
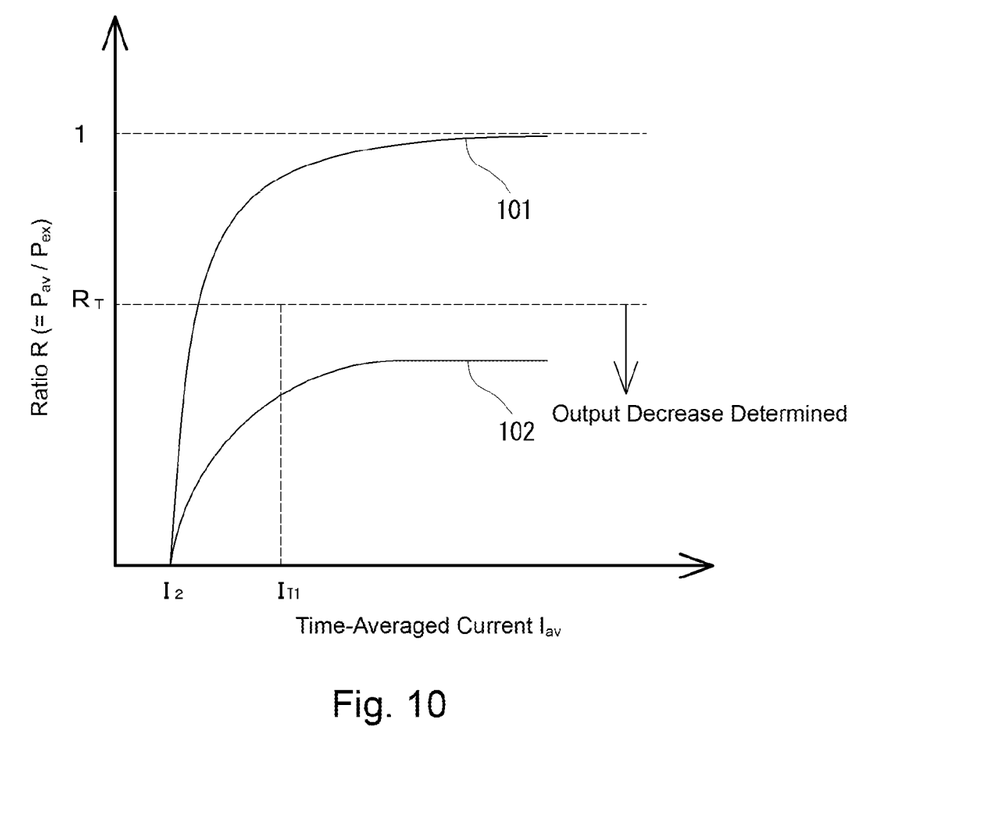
FIG. 10 is a graph explanatory of a method of determining a decrease of an optical output power during the modulation operation with a ratio $R (=P_{av}/P_{ex})$ of the optical output power expectation value $P_{ex}$ and the time-averaged optical output power $P_{av}$.

FIG. 10 is a graph explanatory of a method of determining a decrease of an optical output power during the modulation operation with a ratio R ($=P_{av}/P_{ex}$) of the optical output power expectation value $P_{ex}$ and the time-averaged optical output power $P_{av}$. In FIG. 10, the horizontal axis represents the time-averaged current $I_{av}$, and the vertical axis represents the ratio R ($=P_{av}/P_{ex}$). In the example of FIG. 10, a threshold $R_T$ being used has the same value as the threshold $R_T$ of FIG. 8.

The determination part 50 calculates a ratio R ($=P_{av}/P_{ex}$) from the calculated optical output power expectation value $P_{ex}$ and the time-averaged optical output power $P_{av}$ inputted from the time-averaged optical output power calculator 42. In a range where the time-averaged current $I_{av}$ is smaller than the threshold current $I_2$ for the CW operation, the time-averaged optical output power $P_{av}$ is zero (see FIG. 4), the ratio R is zero as shown in FIG. 10. When the time-averaged current $I_{av}$ becomes greater than $I_2$, the time-averaged optical output power $P_{av}$ increases with respect to the time-averaged current $I_{av}$ at a certain rate as shown in FIG. 4. If no failure or deterioration occurs in a component, the ratio R ($=P_{av}/P_{ex}$) rapidly rises from $I_2$ and gradually approaches 1 as indicated by a curved line 101 of FIG. 10. On the other hand, if failure or deterioration occurs in any component, the rate of an increase of the time-averaged optical output power $P_{av}$ to the time-averaged current $I_{av}$ is lowered. Therefore, the ratio R is getting smaller as indicated by a curved line 102 of FIG. 10.

The determination part 50 determines that the optical output power is lowered if the calculated ratio R becomes smaller than the aforementioned threshold $R_T$ in the aforementioned determinable region where $I_{av} > I_{T1}$. Specifically, in the determinable region of FIG. 10 where $I_{av} > I_{T1}$, the determination part 50 determines that the optical output power is lowered if the calculated ratio R is within a region that is lower than the threshold $R_T$. For example, the optical output power is determined to be lowered within a range of $I_{av} > I_{T1}$ in the case of the curved line 102.

Thus, a decrease of an optical output power can be detected by using a difference D between the optical output power expectation value $P_{ex}$ and the time-averaged optical output power $P_{av}$ or a ratio R of the time-averaged optical output power $P_{av}$ to the optical output power expectation value $P_{ex}$. In other words, according to the present embodiment, a decrease of an optical output power is determined based on a value $I_{av}$ obtained by time-averaging a current $I_i$ supplied to the pumping light source 20 and a value $P_{av}$ obtained by time-averaging an optical output power $P_i$ outputted from the amplifying optical fiber 12. Therefore, a decrease of an optical output power can readily be determined either during a CW operation or during a modulation operation.

In the case of using the difference D in the CW operation, the undeterminable region of the time-averaged current $I_{av}$ is from zero to $I_1$ (see FIG. 7). In contrast, when the ratio R is used, the undeterminable region of the time-averaged current $I_{av}$ is from zero to $I_{T1}$ ($>I_1$) (see FIG. 8). Accordingly, for the CW operation, use of the difference D is more advantageous because a decrease of an optical output power can be determined for a smaller time-averaged current $I_{av}$.

In the case of using the ratio R, the sensitivity of determining a decrease of an optical output power can be enhanced by increasing the threshold $R_T$. Particularly, the sensitivity in a region where the time-averaged current $I_{av}$ has a large value can be enhanced by increasing the threshold $R_T$.

In the above embodiment, the threshold $D_T$ for the difference D and the threshold $R_T$ for the ratio R are held constant during the operation. However, the determination part 50 may vary those thresholds into proper values depending on the value of the time-averaged current $I_{av}$.

If a plurality of pumping light sources 20 are provided, electric currents supplied to the respective pumping light sources 20 may be detected by the current detector 44. Those electric currents may be averaged and outputted to the time-averaged current calculator part 46.

The term "current" used herein includes not only a measured current actually supplied to the pumping light source 20, but also any type of physical quantity that changes according to an electric current actually supplied. Similarly, the term "optical output power" used herein includes not only a measured optical output power actually outputted from the amplifying optical fiber 12, but also any type of physical quantity that changes according to an actual optical output power.

In the above embodiment, an optical amplifier system is exemplified by an optical fiber laser apparatus. Nevertheless, the present invention is applicable to various types of optical amplifier apparatuses other than an optical fiber laser apparatus, including a master oscillator power amplifier (MOPA).

Although some preferred embodiments of the present invention have been described, the present invention is not limited to the aforementioned embodiments. It should be understood that various different forms may be applied to the present invention within the technical idea thereof.

INDUSTRIAL APPLICABILITY

The present invention is suitable for use in an optical amplifier apparatus such as an optical amplifier or an optical fiber laser.

DESCRIPTION OF REFERENCE NUMERALS AND SIGNS 1 optical fiber laser apparatus
10 optical cavity
12 amplifying optical fiber
14 high-reflectivity FBG
16 low-reflectivity FBG
20 pumping light source
22 combiner
32 light emission part
34 partial reflection mirror
40 optical output power detector
42 time-averaged optical output power calculator
44 current detector
46 time-averaged current calculator part
48 storage device
50 determination part

The invention claimed is:

1. A method of determining a decrease of an optical output power in an optical amplifier apparatus operable to output high-power light with use of pumping light from a pumping light source, characterized by:
acquiring a reference current $I_r$ supplied to the pumping light source when a predetermined reference optical output power $P_r$ that is equal to or greater than a maximum optical output power being used is outputted from the optical amplifier apparatus;

detecting a current $I_i$ supplied to the pumping light source during an operation of the optical amplifier apparatus;

time-averaging the detected current $I_i$ with a predetermined time constant to calculate a time-averaged current $I_{av}$;

detecting an optical output power $P_i$ outputted from the optical amplifier apparatus during the operation of the optical amplifier apparatus;

time-averaging the detected optical output power $P_i$ with the predetermined time constant to calculate a time-averaged optical output power $P_{av}$;

calculating an optical output power expectation value $P_{ex}$ represented by $P_{ex}=I_{av}\times P_r/I_r$ from the time-averaged current $I_{av}$, the reference optical output power $P_r$, and the reference current $I_r$; and comparing the time-averaged optical output power $P_{av}$ with the optical output power expectation value $P_{ex}$ to determine a decrease of an optical output power of the optical amplifier apparatus based on the comparison result.

2. The method of determining a decrease of an optical output power in an optical amplifier apparatus as recited in claim 1, characterized in that the comparing the time-averaged optical output power $P_{av}$ with the optical output power expectation value $P_{ex}$ to determine a decrease of the optical output power of the optical amplifier apparatus based on the comparison result comprises calculating a difference ($P_{ex}-P_{av}$) between the optical output power expectation value $P_{ex}$ and the time-averaged optical output power $P_{av}$ and determining that the optical output power of the optical amplifier apparatus is lowered when the difference is greater than a predetermined threshold.

3. The method of determining a decrease of an optical output power in an optical amplifier apparatus as recited in claim 2, characterized in that the predetermined threshold is represented by $I_1\times P_r/I_r$ where $I_1$ is a threshold current of the optical amplifier apparatus for a continuous-wave oscillation operation.

4. The method of determining a decrease of an optical output power in an optical amplifier apparatus as recited in claim 1, characterized in that the comparing the time-averaged optical output power $P_{av}$ with the optical output power expectation value $P_{ex}$ to determine a decrease of an optical output power of the optical amplifier apparatus based on the comparison result comprises calculating a ratio ($P_{av}/P_{ex}$) of the time-averaged optical output power $P_{av}$ to the optical output power expectation value $P_{ex}$ and determining that the optical output power of the optical amplifier apparatus is lowered when the ratio is smaller than a predetermined threshold.

5. The method of determining a decrease of an optical output power in an optical amplifier apparatus as recited in claim 1, characterized by:

calculating a modified optical output power expectation value $P_{ex}'$ represented by $P_{ex}'=(I_{av}-I_2)\times P_r/(I_r-I_2)$ where $I_2$ is a threshold current of the optical amplifier apparatus for a modulation operation; and using the modified optical output power expectation value $P_{ex}'$ instead of the optical output power expectation value $P_{ex}$ to determine a decrease of the optical output power of the optical amplifier apparatus.

6. The method of determining a decrease of an optical output power in an optical amplifier apparatus as recited in claim 1, characterized by varying the predetermined threshold depending upon the detected current $I_i$.

7. The method of determining a decrease of an optical output power in an optical amplifier apparatus as recited in claim 2, characterized by varying the predetermined threshold depending upon the detected current $I_i$.

8. The method of determining a decrease of an optical output power in an optical amplifier apparatus as recited in claim 4, characterized by varying the predetermined threshold depending upon the detected current $I_i$.

9. The method of determining a decrease of an optical output power in an optical amplifier apparatus as recited in claim 5, characterized by varying the predetermined threshold depending upon the detected current $I_i$.

10. An optical amplifier system characterized by comprising:

an optical amplifier apparatus operable to output high-power light with use of pumping light from a pumping light source;

a storage device operable to store a predetermined reference optical output power $P_r$ that is equal to or greater than a maximum optical output power being used in the optical amplifier apparatus and a reference current $I_r$ supplied to the pumping light source when the reference optical output power $P_r$ is outputted;

a current detector operable to detect a current $I_i$ supplied to the pumping light source;

a time-averaged current calculator part operable to time-average the current $I_i$ detected by the current detector with a predetermined time constant to calculate a time-averaged current $I_{av}$;

an optical output power detector operable to detect an optical output power $P_i$ outputted from the optical amplifier apparatus;

a time-averaged optical output power calculator operable to time-average the optical output power $P_i$ detected by the optical output power detector with the predetermined time constant to calculate a time-averaged optical output power $P_{av}$; and a determination part operable to calculate an optical output power expectation value $P_{ex}$ represented by $P_{ex}=I_{av}\times P_r/I_r$ from the time-averaged current $I_{av}$ calculated by the time-averaged current calculator part and the reference optical output power $P_r$ and the reference current $I_r$ stored in the storage device and to compare the time-averaged optical output power $P_{av}$ calculated by the time-averaged optical output power calculator with the optical output power expectation value $P_{ex}$ to determine a decrease of an optical output power of the optical amplifier apparatus based on the comparison result.

11. The optical amplifier system as recited in claim 10, characterized in that the determination part is operable to calculate a difference ($P_{ex}-P_{av}$) between the optical output power expectation value $P_{ex}$ and the time-averaged optical output power $P_{av}$ and to determine that the optical output power of the optical amplifier apparatus is lowered when the difference is greater than a predetermined threshold.

12. The optical amplifier system as recited in claim 11, characterized in that the predetermined threshold is represented by $I_1\times P_r/I_r$ where $I_1$ is a threshold current of the optical amplifier apparatus for a continuous-wave oscillation operation.

13. The optical amplifier system as recited in claim 10, characterized in that the determination part is operable to calculate a ratio ($P_{av}/P_{ex}$) of the time-averaged optical output power $P_{av}$ to the optical output power expectation value $P_{ex}$ and to determine that the optical output power of the optical amplifier apparatus is lowered when the ratio is smaller than a predetermined threshold.

14. The optical amplifier system as recited in claim 10, characterized in that the determination part is operable to calculate a modified optical output power expectation value $P_{ex}'$ represented by $P_{ex}'=(I_{av}-I_2)\times P_r/(I_r-I_2)$ where $I_2$ is a threshold current of the optical amplifier apparatus for a modulation operation and to use the modified optical output power expectation value $P_{ex}'$ instead of the optical output power expectation value $P_{ex}$ to determine a decrease of the optical output power of the optical amplifier apparatus.

15. The optical amplifier system as recited in claim 10, characterized in that the determination part is operable to vary the predetermined threshold depending upon the detected current $I_i$ by the current detector.

16. The optical amplifier system as recited in claim 11, characterized in that the determination part is operable to vary the predetermined threshold depending upon the detected current $I_i$ by the current detector.

17. The optical amplifier system as recited in claim 13, characterized in that the determination part is operable to vary the predetermined threshold depending upon the detected current $I_i$ by the current detector.

18. The optical amplifier system as recited in claim 14, characterized in that the determination part is operable to vary the predetermined threshold depending upon the detected current $I_i$ by the current detector.

* * * * *